(12) United States Patent
Daigle

(10) Patent No.: US 6,499,815 B1
(45) Date of Patent: *Dec. 31, 2002

(54) TRACTION VEHICLE/WHEEL SLIP AND SLIDE CONTROL

(75) Inventor: Jeffrey Louis Daigle, Northeast, PA (US)

(73) Assignee: General Electric Company, Schenectady, NY (US)

(\*) Notice: Subject to any disclaimer, the term of this patent is extended or adjusted under 35 U.S.C. 154(b) by 336 days.

This patent is subject to a terminal disclaimer.

(21) Appl. No.: 09/680,784

(22) Filed: Oct. 6, 2000

Related U.S. Application Data

(63) Continuation of application No. 08/799,599, filed on Feb. 12, 1997, now Pat. No. 6,152,546.

(51) Int. Cl.$^7$ .................................................. B60K 1/00
(52) U.S. Cl. ...................................... 303/151; 303/178
(58) Field of Search .................................. 303/151, 178

(56) References Cited

U.S. PATENT DOCUMENTS 6,152,546 A \* 11/2000 Daigle ........................ 303/151

\* cited by examiner

*Primary Examiner*—Matthew C. Graham
(74) *Attorney, Agent, or Firm*—Carl A. Rowdd; David R. Risley

(57) ABSTRACT

The system and method maximize available rail adhesion between the rails of a track and the wheels of a rail vehicle so that the vehicle is better able to accelerate up to operating speed and to decelerate to a stop condition under poor rail conditions. The system implements a control logic function which relies on a measured variable that is different than the controlled error signal utilized to affect control of the vehicle. The control system is enabled based on creep speed while the parameter used to effect control is wheel acceleration.

12 Claims, 3 Drawing Sheets

TRACTION VEHICLE/WHEEL SLIP AND SLIDE CONTROL

CROSS-REFERENCE TO RELATED APPLICATION

The present application is a continuation application of U.S. patent application Ser. No. 08/799,599, filed Feb. 12, 1997, now U.S. Pat. No. 6,152,546 which is hereby incorporated by reference into the present disclosure.

BACKGROUND OF THE INVENTION

The present invention relates to control systems for electric motor powered traction vehicles such as locomotives, transit vehicles or off-highway vehicles and, more particularly, the invention relates to a method for controlling such a vehicle in a manner to correct for wheel slip or slide during propulsion and electrical retarding, respectively.

Locomotives and transit vehicles as well as other large traction vehicles are commonly powered by electric traction motors coupled in driving relationship to one or more axles of the vehicle. Locomotives and transit vehicles generally have at least four axle-wheel sets per vehicle with each axle-wheel set being connected via suitable gearing to the shaft of a separate electric motor commonly referred to as a traction motor. In the motoring mode of operation, the traction motors are supplied with electric current from a controllable source of electric power (e.g., an engine-driven traction alternator) and apply torque to the vehicle wheels which exert tangential force or tractive effort on the surface on which the vehicle is traveling (e.g., the parallel steel rails of a railroad track), thereby propelling the vehicle in a desired direction along the right of way. Alternatively, in an electrical braking mode of operation, the motors serve as axle-driven electrical generators. Torque is applied to their shafts by their respectively associated axle-wheel sets which then exert braking effort on the surface, thereby retarding or slowing the vehicle's progress. In either case, good adhesion between each wheel and the surface is required for efficient operation of the vehicle.

Maximum tractive or braking effort is obtained if each powered wheel of the vehicle is rotating at such an angular velocity that its actual peripheral speed is slightly higher (motoring) or slightly lower (braking) than the true vehicle speed (i.e., the linear speed at which the vehicle is traveling, usually referred to as "ground speed" or "track speed"). The difference between wheel speed and track (or "ground") speed is referred to as "slip speed." There is a relatively low limit value of slip speed at which peak tractive or braking effort is realized. This value, commonly known as maximum "creep speed," is a variable that depends on track speed and rail conditions. So long as the maximum creep speed is not exceeded, slip speed is normal and the vehicle will operate in a stable microslip or creep mode. If wheel-to-rail adhesion tends to be reduced or lost, some or all of the vehicle wheels may slip excessively, i.e., the actual slip speed may be greater than the maximum creep speed. Such a wheel slip condition, which is characterized in the motoring mode by one or more spinning axle-wheel sets and in the braking mode by one or more sliding or skidding axle-wheel sets, can cause accelerated wheel wear, rail damage, high mechanical stresses in the drive components of the propulsion system, and an undesirable decrease of tractive (or braking) effort.

Many different systems are disclosed in the prior art for automatically detecting and recovering from undesirable wheel slip conditions. Typically, differential speeds between axle-wheel sets or rate of change of wheel speed or a combination of these two measurements are used to detect wheel slip. Speed is monitored and if found to exceed predetermined differentials or rates of change, power to the motors is reduced in an attempt to bring speed to a value at which traction is regained. The disadvantage of such systems of wheel slip control is that the controlled variable, i.e., creep speed, is also the signal used to enable correction.

SUMMARY OF THE INVENTION

Among the several objects of the present invention may be noted the provision of a wheel slip and wheel slide correction system in which the monitored or trigger variable is different from the control variable, and a wheel slip and wheel slide system in which the variable used for detecting a wheel slip or wheel slide is a function of vehicle velocity while the variable used to correct for wheel slip or wheel slide is a function of wheel acceleration. In illustrative form, the invention is illustrated as a method for correcting for wheel slip or wheel slide in an electric traction motor propelled vehicle such as a locomotive. The locomotive includes a motor control system for establishing a torque request for controlling the torque produced by at least one electric traction motor coupled in driving relationship to at least one wheel of the locomotive. The inventive system obtains values corresponding to the actual vehicle velocity from auxiliary measuring devices and computes from that velocity corresponding wheel rotational velocity and wheel acceleration values for the vehicle. Tachometers are used to measure actual wheel velocity and the values of actual wheel acceleration are obtained as a first derivative of the wheel velocity values. The system compares actual wheel velocity to the equivalent computed wheel velocity to determine if the wheel creep speed is greater than desired. If creep speed is greater than some minimum value, a wheel slip or wheel slide signal is generated which actuates the torque correction circuit. A torque correction circuit computes the difference between the equivalent wheel acceleration value derived from actual vehicle velocity and compares that to the computed wheel acceleration derived by measuring wheel velocity. The difference between the measured wheel acceleration and the equivalent wheel acceleration is then applied as a correction factor to the torque request signal so as to adjust the actual motor torque in a manner to correct with wheel slip or slide conditions. In addition to the basic function as described above, the system also implements a substantial torque reduction function if the actual wheel velocity varies from the computed wheel velocity by more than some larger amounts such as, for example, 20% in propulsion or 30% in braking modes. The system also monitors the actual locomotive speed to inhibit operation of the torque correction circuit unless the locomotive speed actually exceeds some minimum velocity so as to prevent shutdown during initial start up of a locomotive from rest.

BRIEF DESCRIPTION OF THE DRAWINGS

For a better understanding of the present invention, reference may be had to the following detailed description taken in conjunction with the accompanying drawings in which.

DETAILED DESCRIPTION OF A PREFERRED EMBODIMENT OF THE INVENTION

Figure 1:
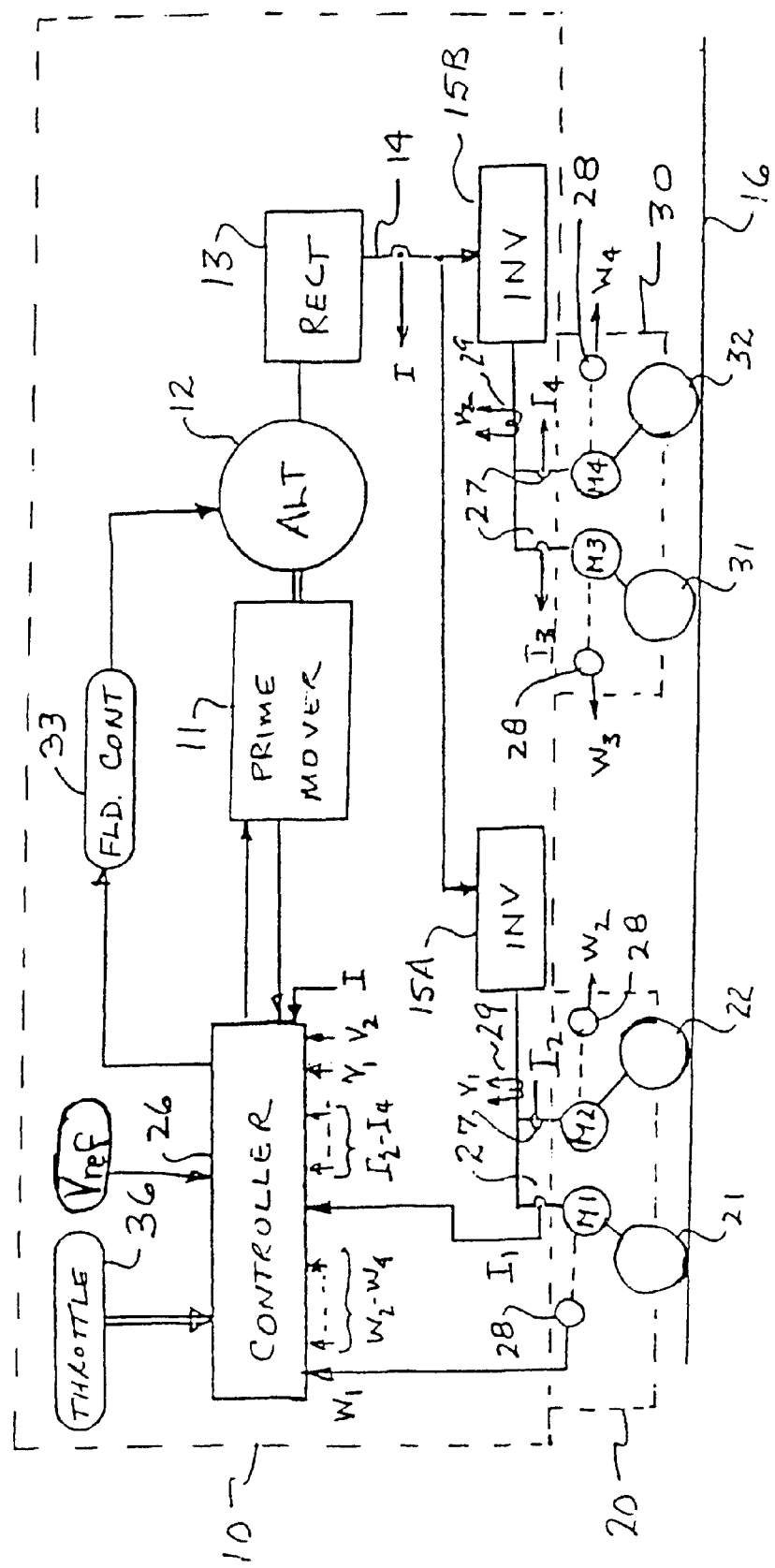
FIG. 1 is a simplified block diagram of the principal components of a propulsion system for a diesel-electric locomotive with which the present invention may be used.

The present invention may be utilized in various types of alternating current (AC) induction motor powered vehicles such as, for example, off-highway vehicles (earth moving machines), transit cars and locomotives. For purpose of illustration, the invention is described herein as it may be applied to a locomotive. The propulsion system 10 of FIG. 1 includes a variable speed prime mover 11 mechanically coupled to a rotor of a dynamo electric machine 12 comprising a 3-phase alternating current (AC) synchronous generator or alternator. The 3-phase voltages developed by alternator 12 are applied to AC input terminals of a conventional power rectifier bridge 13. The direct current (DC) output of bridge 13 is coupled via DC link 14 to a pair of controlled inverters 15A and 15B which inverts the DC power to AC power at a selectable variable frequency. The AC power is electrically coupled in energizing relationship to each of a plurality of adjustable speed AC traction motors M1 through M4. Prime mover 11, alternator 12, rectifier bridge 13 and inverters 15A, 15B are mounted on a platform of the traction vehicle 10, illustrated as a 4-axle diesel-electric locomotive. The platform is in turn supported on two trucks 20 and 30, the first truck 20 having two axle-wheel sets 21 and 22 and the second truck 30 having two axle-wheel sets 31 and 32.

Each of the traction motors M1–M4 is hung on a separate axle and its rotor is mechanically coupled, via conventional gearing, in driving relationship to the associated axle-wheel set. In the illustrative embodiment, the two motors M1 and M2 are electrically coupled in parallel with one another and receive power from inverter 15A while motors M3 and M4 are coupled to inverter 15B. However, in some instances, it may be desirable to provide an inverter for each motor or to couple additional motors to a single inverter. Suitable current transducers 27 and voltage transducers 29 are used to provide a family of current and voltage feedback signals, respectively, representative of the magnitudes of current and voltage in the motor stators. Speed sensors 28 are used to provide speed signals representative of the rotational speeds W1–W4 in revolutions per minute (RPM) of the motor shafts. These speed signals are readily converted to wheel speed in a well known manner. For simplicity, only single lines have been indicated for power flow although it will be apparent that the motors M1–M4 are typically three phase motors so that each power line represents three lines in such applications.

The magnitude of output voltage and current supplied to rectifier bridge 13 is determined by the magnitude of excitation current supplied to the field windings of the alternator 12 by field controller 33 which may be a conventional phase controlled rectifier circuit since the alternator field requires DC excitation. The excitation current is set in response to an operator demand (Throttle 36) for vehicle speed by the controller 26 which is in turn responsive to actual speed as represented by signals W1–W4. The controller 26 converts the speed command to a corresponding torque request for use in controlling the motors M1–M4. Since AC motor torque is proportional to rotor current and air gap flux, these quantities may be monitored or, more commonly, other quantities such as applied voltage, stator current and motor RPM may be used to reconstruct motor torque in controller 26. See, for example, U.S. Pat. No. 4,243,927.

In an electrical braking or retarding mode of operation, inertia of the moving vehicle is converted into electrical energy by utilizing the traction motors as generators. Motor voltage and current are controlled to set a desired braking effort.

In either motoring or braking, it is desirable to control the motors so as to minimize slip or slide, i.e., in the illustrative locomotive system to minimize slipping or sliding of the wheels on the rail 16. Slip and/or slide is an indication of a lack of traction and therefore undesirable in either motoring or braking. Note that slip as used here is distinguished from creep even though creep is a form of micro-slip. For a detailed description of wheel slip in a traction vehicle application, reference may be made to U.S. Pat. No. 5,480,220 to Kumar and assigned to General Electric Company. That patent describes an AC motor system with concerns and comments regarding wheel slip that are similar to the concerns in the present case. The Kumar patent also discloses a torque control system and the general description of torque control is applicable to the present application.

The present invention is implemented in the controller 26 in the system of FIG. 1 and relies on a vehicle reference velocity signal ($V_{ref}$) derived from an auxiliary source such as a speed sensing radar, GPS detector or simply a separate tachometer mounted to a non-driven wheel.

Figure 2:
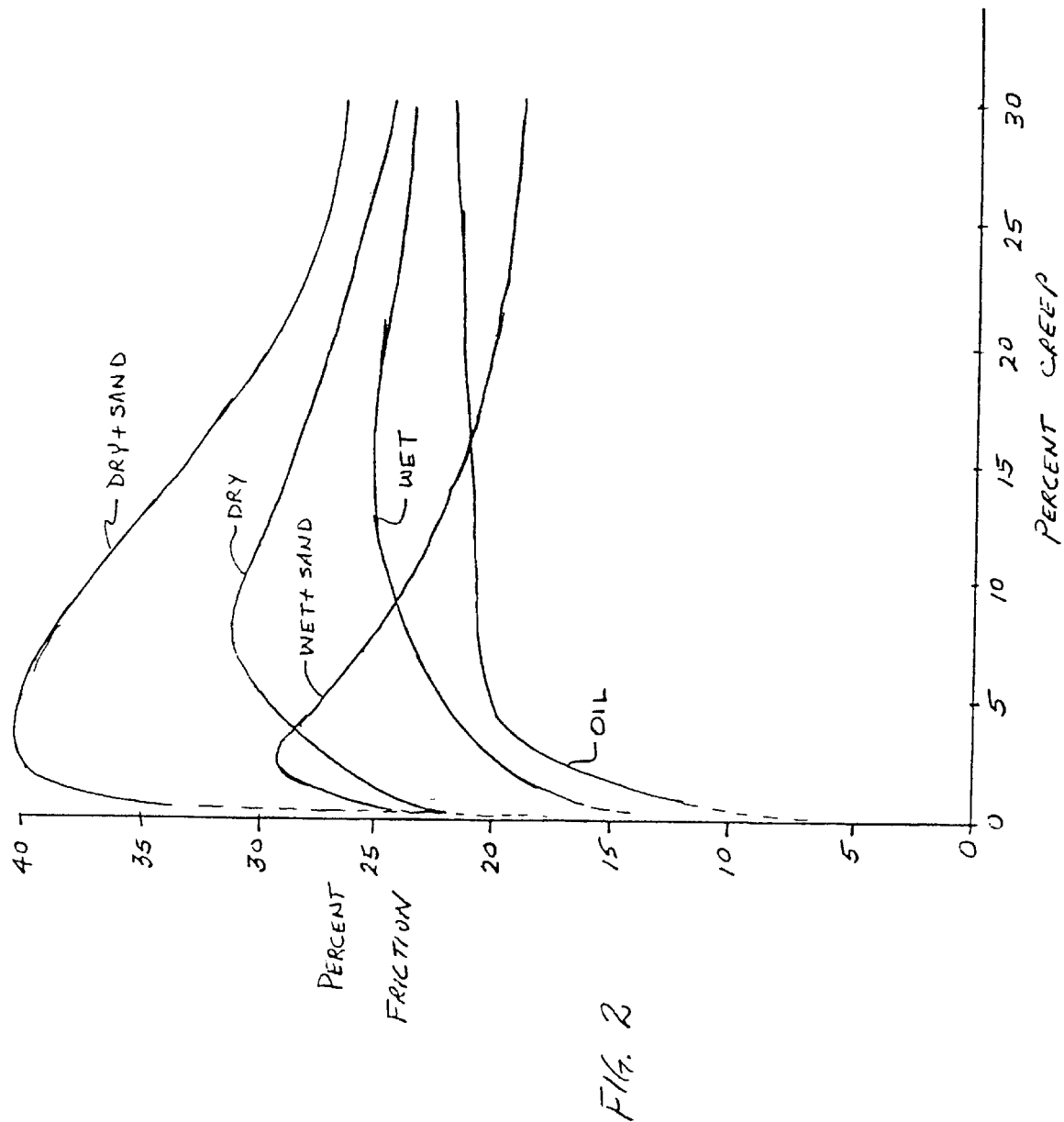
FIG. 2 is a graph showing characteristic curves for percent friction versus percent creep in a rail vehicle.

Before turning to a description of the detailed implementation of the present invention, reference is first made to FIG. 2 which illustrates some examples of wheel to rail slipping or sliding in locomotive applications. In FIG. 2, the vertical axis represents percent friction and horizontal axis represents percent creep. It will be noted that the curve for a rail having an oil film illustrates relatively low friction which reaches a maximum value at about a 5% creep level. The highest friction is obviously available with a rail which is both dry and sanded. As shown by the illustrated curve, the percent friction reaches a peak at about 5% and then gradually reduces as creep speed increases. A dry rail has maximum friction at some value of creep less than 10% while a wet rail may not reach maximum friction until creep speed reaches approximately 15%. In general, it is desirable to maintain creep speed at the point at which maximum percent friction occurs. In the case of both a dry rail and a wet rail, sand can force the maximum friction to occur at a creep speed less than 5%. The curves of FIG. 2 will provide some insight into the selection of threshold values which are used in the implementation of the present invention.

Figure 3:
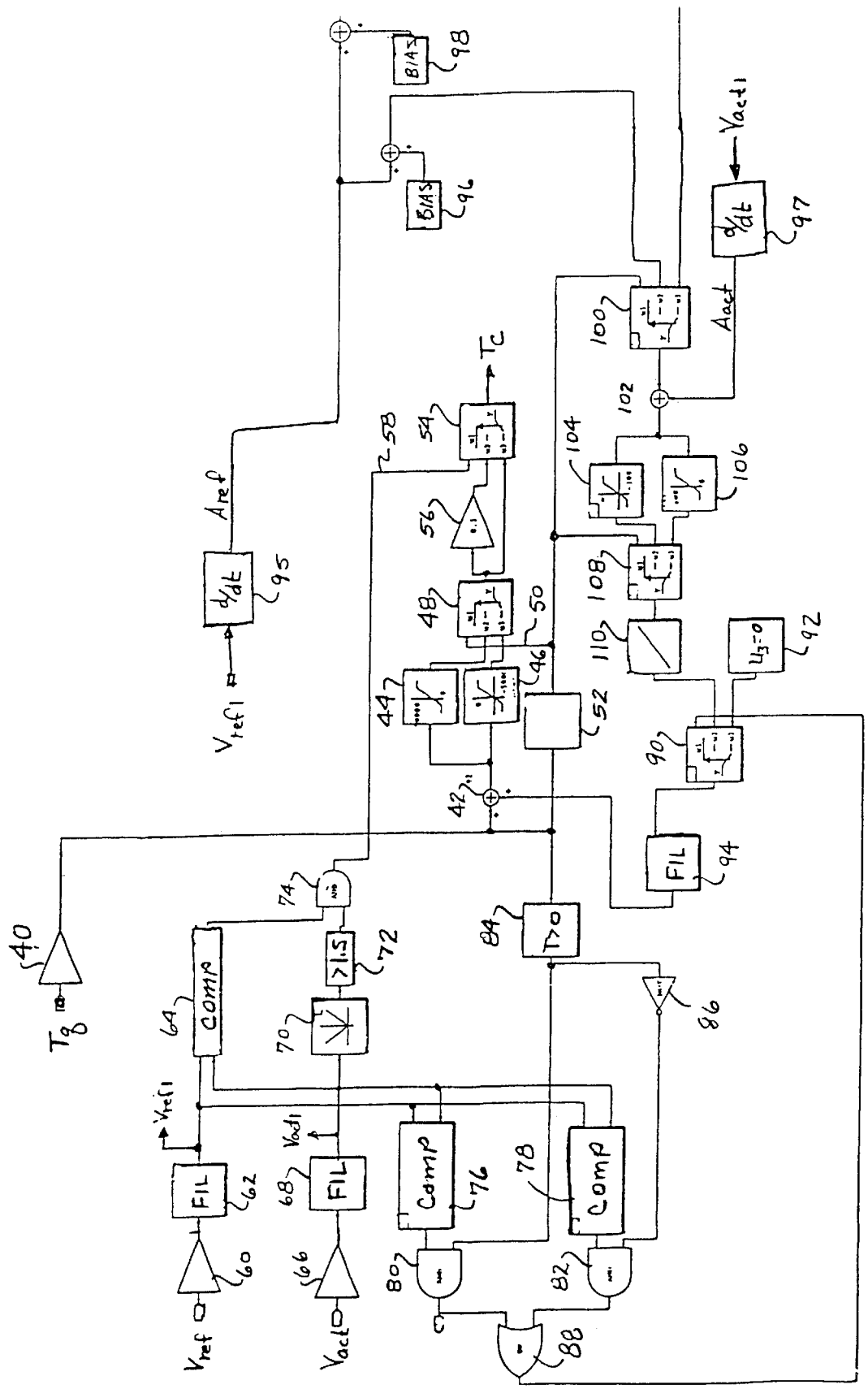
FIG. 3 is a simplified functional block diagram of the present invention.

Referring now to FIG. 3, there is shown a simplified functional block diagram of one implementation of the present invention. The invention provides a modification of the torque command ($T_q$) generated by the controller 26 whenever wheel slip or slide is detected. It will be recognized that all of the functions illustrated in FIG. 3 are implemented in the microcomputer in software operable in the controller 26. During normal operation, a torque request ($T_q$) generated by controller 26 is processed through the software equivalent of a buffer amplifier 40 and applied to a summing junction 42. From summing junction 42, the torque request is processed either as a command for acceleration or a command for braking. If the torque request is for acceleration, the request is limited to positive values as indicated by block 44. If the torque request is for braking or retarding of the vehicle, the request is limited to negative values as illustrated by block 46. The outputs of each of the blocks 44 and 46 are supplied to a selection block 48 which passes either the positive value or the negative value depending upon the status of a control signal on line 50. The signal on line 50 is derived from a comparison block 52 which monitors the torque request signal $T_q$ and determines whether the request signal is positive, i.e., greater than zero, and therefore requesting propulsion, or whether the signal is less than zero and therefore corresponds to a braking torque.

From block 48, the torque request signal is supplied either directly to block 54, which is another selection block, or through a reduction block 56 to another input of the selection block 54. The selection block 54 is controlled by a signal on line 58 which is derived by a velocity comparison function. For the moment, it will be assumed that the vehicle is not undergoing any significant slip or slide so that the signal applied directly from block 48 is processed by selection circuit 54 and becomes the output torque command signal $T_C$. In this scenario, the torque command output signal $T_C$ is the same value as the input torque request signal $T_q$.

In order to detect whether or not the vehicle wheels are slipping or sliding, the system initially compares a vehicle forward velocity converted to wheel speed to a measured value of wheel speed on one of the locomotive's driven wheels. In particular, a reference wheel speed value $V_{ref}$ is derived from actual vehicle speed obtained by means well known in the art, such as, for example, a tachometer on an idler wheel of the locomotive, a GPS sensor or a radar speed detector. This reference speed signal is applied through a buffer block 60 and a noise filter circuit 62 as one input to a comparator block 64. Local or actual wheel speed $V_{act}$ is obtained from an axle tachometer in the manner described with regard to FIG. 1 and is applied through a buffer block 66 and noise filter 68 to a second input of the comparator 64. The comparator 64 determines whether or not the actual wheel speed $V_{act}$ is more than 20% greater than the reference wheel speed $V_{ref}$ for propulsion or whether the actual wheel speed is less than 70% of the reference wheel speed for braking. In other words, the comparator 64 determines whether the creep speed in a propulsion mode is greater than 20% or creep speed in the braking mode is greater than 30%. If either of these events occur, the vehicle is assumed to be in a severe slip or slide condition and it is desirable to immediately force a significant cutback in the torque command signal. However, it is also necessary to assure that the vehicle is moving since there may be high values of slip as the vehicle is initially started from zero speed. Accordingly, the actual or local wheel speed signal $V_{act}$ is also applied to an absolute value block 70 to convert to absolute value and then the absolute value is compared to a preselected minimum value such as a value of 1.5 miles per hour in block 72 to assure that the locomotive is actually moving. If movement is occurring, the AND function indicated by block 74 is enabled so that the logic signal developed by block 64 is coupled onto line 58 to force switch block 54 into a condition where the output of the amplifier 56 is now applied through block 54 as the torque command signal. The amplifier 56 preferably reduces the magnitude of the torque command signal by some very large value such as 90%. This severe or full cutback of the torque command signal assures that the torque value at the motors is immediately reduced allowing the vehicle to regain traction.

Assuming that the system is not operating in a severe slip or slide condition, the function of the system of FIG. 3 is to detect early onset of slip or slide and effect micro adjustments in the torque command signal as a function of the difference between actual wheel acceleration and measured wheel acceleration. In this regard, the reference wheel speed signal $V_{ref}$ and the actual wheel speed signal $V_{act}$ are applied to comparison blocks 76 and 78. Comparison block 76 is used in the propulsion mode to detect slip or creep and comparison block 78 is used in the braking mode to detect wheel slide. Comparison block 76 detects a relatively low value of wheel creep, for example, 7%, by determining whether or not the value of the actual wheel speed is greater than 1.07 times the value of the reference wheel speed. If creep is greater than 7%, a logical signal is applied from block 76 to an AND function 80. The AND function 80 in conjunction with another AND function 82 represents a decision tree which determines whether or not the detected difference between actual wheel speed and reference wheel speed is a slip condition or a slide condition. Note that the comparison made in block 78 between actual and reference wheel speed is to determine whether or not the actual wheel speed is more than 5% less than the reference wheel speed. If that condition is true, it is assumed that a slide condition occurs and an output signal is supplied to the AND function 82. Control of the AND functions 80 and 82 is from a logic function 84 which monitors the polarity of the torque request signal $T_q$. If the torque request signal is greater than zero, then propulsion is occurring and the output of the logic function 84 is such as to enable AND gate 80. If the torque request is negative, the output of the logic function 84 is logically negative thereby disabling logic function 80 and enabling logical AND function 82 via logic inverter 86.

The output signals generated by each of the AND functions 80 and 82 are OR'd together in a functional OR block 88 and supplied to another switching block 90. The switching block 90 selects one of two input signals depending on the status of the output signal from block 88. In particular, if the output signal of block 88 is a logical zero indicating that no slip or slide is occurring, the input through block 90 is derived from functional block 92 which merely provides a zero input value to block 90. The zero input value is passed through a noise filter block 94 and then applied to summing junction 42. If the value is zero, then this action will have no effect on the value of the torque command signal $T_C$. If, however, the value of the signal from the OR function 88 is a logical one indicating that slip or slide is occurring, the function of block 90 is to select a correction factor which can be applied to the torque request signal $T_q$.

The torque command correction factor is derived by comparing measured wheel acceleration to a reference value of wheel acceleration. The reference value of wheel acceleration $A_{ref}$ is derived as the first derivative of the reference wheel speed indicated by functional block 95 with input $V_{ref1}$ from block 62. The computation of a derivative of the reference wheel velocity signal to obtain acceleration is well known in the art and will not be described in detail. Similarly, the value of the actual or measured wheel acceleration $A_{act}$ is derived as a first derivative of the measured wheel speed in block 97 which operates on filtered signal $V_{act1}$ from the functional noise filter block 68. Before comparing the reference wheel acceleration to actual wheel acceleration, it may be desirable to add offset values or bias values to the reference wheel acceleration to establish some degree of hysterisis to prevent oscillation in the control circuits. The offset value for propulsion may be positive and the offset value for braking may be a negative so that two separate functional blocks are shown at 96 and 98 for offset biasing the reference wheel acceleration signal $A_{ref1}$. The signals are then applied to separate functional inputs of the switch block 100, which block uses the torque request signal $T_q$ to determine whether the system is in a propulsion or braking mode of operation. If the torque command signal is positive, then the propulsion signal is used and applied from block 100 to summing junction 102 where it is combined with the actual wheel acceleration signal $A_{act}$. The difference between the reference wheel acceleration and actual wheel acceleration is then applied to each of a pair of limiter circuits 104 and 106. The limiter circuit 104 represents the situation in which the actual measured wheel speed is greater than reference wheel speed and is applied to limit negative values of acceleration difference. The functional block 106 limits the difference for positive values of wheel speed when the actual wheel speed is less than the reference value. More particularly, block 104 corresponds to a slip condition and block 106 corresponds to a slide condition. The signals from each of the blocks 104 and 106 are applied to another selection circuit 108 which responds to the logic signal developed by the comparison circuit 52. As will be recalled, the signal from logic circuit 52 indicates by its logical state whether the system is in a propulsion or braking mode of operation. If in a propulsion mode, the switching circuit 108 is so conditioned as to pass the signal from the limiter circuit 104, which signal is then applied to a linear gain amplifier block 110. The output of the block 110 then becomes the second input signal to the selection circuit 90. Now, if the output from the OR function block 88 is such as to indicate that a creep or slide condition is occurring for which correction should be made, the block 90 will pass a signal which is proportional to the difference between the actual acceleration and the reference acceleration signals to the summing junction 42 for modifying the torque request signal in an appropriate direction to reduce the torque being developed by the vehicle motors. In such case, the torque command signal now differs from the torque request signal.

It will be appreciated from a reading of the description given above with regard to FIG. 3, that the system utilizes velocity difference to detect a slip or slide condition and thereafter uses acceleration differences to effect a variation in the torque command signal so as to overcome the slip and slide conditions. Further, while the system is illustrated in functional block diagrams in FIG. 3, it will be appreciated that these block diagrams represent a software implementation of the invention in the microcomputer circuitry of controller 26 in FIG. 1.

While the invention has been described in what is presently considered to be a preferred embodiment, various modifications and improvements will become apparent to those skilled in the art. It is intended therefore that the invention not be limited to the specific disclosed embodiment but be interpreted within the full spirit and scope of the appended claims.

What is claimed is:

1. A wheel slip/slide correction system for a vehicle having at least one electric motor driven wheel, the system comprising:
    at least one sensor providing a first signal representative of actual vehicle velocity;
    at least one sensor providing a second signal representative of actual vehicle acceleration;
    at least one sensor providing a third signal representative of measured wheel velocity of the driven wheel;
    at least one sensor providing a fourth signal representative of measured wheel acceleration of the driven wheel;
    an electrical circuit for converting the first and second signals to an equivalent wheel velocity and an equivalent wheel acceleration, respectively;
    an electrical circuit for comparing the equivalent wheel velocity to the measured wheel velocity and for obtaining at least one velocity error signal representative of the difference therebetween;
    an electrical circuit for comparing the at least one velocity error signal to at least one velocity threshold value and for generating a slip/slide signal;
    a processor responsive to the slip/slide signal for developing an acceleration error signal representative of the difference between the equivalent wheel acceleration and the measured wheel acceleration; and
    a controller applying the acceleration error signal to adjust power to the driven wheel in a manner to reduce velocity error when the at least one velocity error signal exceeds the threshold value.

2. The wheel slip/slide correction system of claim 1, wherein the vehicle comprises an electric traction motor propelled vehicle including an electric power controller responsive to a torque request signal for controlling electric power supplied to at least one electric motor connected in driving relationship to the at least one driven wheel, the controller being responsive to the slip/slide signal for adjusting electric power in relation to the acceleration error signal.

3. A method for wheel slip/slide correction for a vehicle having at least one electric motor driven wheel, the method comprising:
    providing a first signal representative of actual vehicle velocity;
    providing a second signal representative of actual vehicle acceleration;
    providing a third signal representative of measured wheel velocity of the driven wheel;
    providing a fourth signal representative of measured wheel acceleration of the driven wheel;
    converting the first and second signals to equivalent wheel velocity and to equivalent wheel acceleration signals, respectively;
    comparing the equivalent wheel velocity signal to the measured wheel velocity signal and obtaining an error signal representative of the difference therebetween;
    comparing the error signal to a velocity threshold value and for generating a slip/slide signal;
    developing, in response to the slip/slide signal, an acceleration error signal representative of any difference between the measured wheel acceleration and the equivalent wheel acceleration; and
    applying the acceleration error signal to adjust power to the motor in a manner to reduce the velocity error signal when the velocity error signal exceeds the threshold value.

4. The method of claim 3, wherein the vehicle comprises an electric traction motor propelled vehicle including an electric power controller responsive to a torque command signal for controlling electric power supplied to at least one electric motor connected in driving relationship to the at least one driven wheel, the method further comprising using the acceleration error signal and the torque command signal to adjust power to the motor to correct the slip/slide condition.

5. A method for correcting for wheel slip/slide in an electric traction motor propelled vehicle, the vehicle including a motor control system for establishing a torque request signal for controlling torque produced by at least one electric motor coupled in driving relationship to at least one wheel of the vehicle, the method comprising:
    obtaining actual vehicle velocity and computing therefrom values corresponding to actual wheel rotational velocity and actual wheel acceleration for the actual vehicle velocity;
    sensing a measured wheel velocity and deriving therefrom a measured wheel acceleration;
    determining if actual wheel velocity varies from the measured wheel velocity by more than a selected first minimum value and, if so, generating a wheel slip/slide signal;
    computing, in response to the slip/slide signal, a difference between actual wheel acceleration and measured wheel acceleration; and adjusting the torque request signal in light of the difference between actual wheel acceleration and measured wheel acceleration so as to adjust motor torque in a manner to correct the wheel slip/slide condition.

6. The method of claim 5, further comprising determining if the actual wheel velocity varies from the measured wheel velocity by more than a second minimum value greater than the first minimum value and, if so, reducing the torque request signal until the variation between actual and measured wheel velocities is less than the second minimum value.

7. The method of claim 6, further comprising inhibiting modification of the torque request signal until the vehicle velocity exceeds a minimum threshold value.

8. The method of claim 5, wherein the first minimum value includes a slip value and a slide value and the method of determining includes comparing actual wheel velocity to the measured wheel velocity for each of the slip and slide values for generating respective wheel slip and wheel slide signals.

9. The method of claim 8, further comprising determining if the vehicle is in a propulsion or a braking mode and enabling a corresponding one of the slip and slide signals.

10. A method for correcting wheel slip/slide for a vehicle having at least one electric motor driven wheel, the method comprising:

establishing a first velocity signal using measurements from a source independent of the driven wheel;

establishing a second velocity signal using measurements taken at least in part from the driven wheel;

comparing the first and second velocity signals to obtain at least one velocity error signal representative of the difference therebetween;

determining if the velocity error signal exceeds a threshold value;

establishing a first acceleration signal using measurements from a source independent of the driven wheel;

establishing a second acceleration signal using measurements taken, at least in part from the driven wheel;

comparing the first and second acceleration signals to obtain at least one acceleration error signal representative of the difference therebetween; and using the acceleration error signal to adjust the power provided to the driven wheel to reduce the velocity error if the velocity error signal has been found to exceed the threshold value.

11. The method of claim 10 wherein the first velocity signal is calculated from the actual velocity of the vehicle from the source independent of driven wheel and the second velocity signal is calculated from measurements of the speed of the driven wheel.

12. A wheel slip/slide correction system for a vehicle having at least one electric motor driven wheel, the system comprising:

at least one sensor for monitoring a parameter independent of the driven wheel and generating a first signal representative of velocity;

at least one sensor for monitoring a parameter independent of the driven wheel and generating a second signal representative of acceleration;

at least one sensor for monitoring a parameter directly related to the driven wheel and generating a third signal representative of velocity;

at least one sensor for monitoring a parameter directly related to the driven wheel and generating a fourth signal representative of acceleration;

an electrical circuit receiving the first and third signals and generating a velocity error signal representative of the difference between the first and third signals and generating a slip/slide signal when the velocity error exceeds a threshold;

an electric circuit responsive to the slide/slide signal for developing an acceleration error signal representative of the difference between the second and fourth signals; and a controller using the acceleration error signal to adjust power to the driven wheel in a manner to reduce the velocity error, when the difference between the first and third signals exceed a threshold value.

* * * * *